Nov. 29, 1960

C. WANTZ ET AL 2,961,876

THERMOSTATIC CONTROL FOR SURFACE BURNERS

Filed Oct. 8, 1958

Nov. 29, 1960 C. WANTZ ET AL 2,961,876
THERMOSTATIC CONTROL FOR SURFACE BURNERS
Filed Oct. 8, 1958 2 Sheets-Sheet 2

United States Patent Office 2,961,876
Patented Nov. 29, 1960

2,961,876
THERMOSTATIC CONTROL FOR SURFACE BURNERS

Clarence Wantz and Henry J. Durst, Greensburg, Pa., assignors to Robertshaw-Fulton Controls Company, Richmond, Va., a corporation of Delaware Filed Oct. 8, 1958, Ser. No. 765,977

4 Claims. (Cl. 73—368)

This invention relates generally to thermostatic controls and more particularly to controls for surface heaters of cooking ranges and the like.

It has long been considered desirable to provide thermostatic control of the surface heating elements of cooking ranges in order to protect the contents of the cooking vessel placed thereon. Preferably, the contact of the thermal element of the thermostatic control with the cooking vessel should be on the exterior, easily made and broken, and within the zone of greatest heat of the surface heating element. It is also necessary that the thermal element respond to the temperature of the cooking vessel and not to that prevailing at the source of heat. Furthermore, the arrangement of the parts should be sufficiently flexible to permit the thermostatic control to be placed at any desired location on the range, either adjacent or remote from the surface heater.

An object of this invention is to insure response of a temperature control device of the indicated type to the temperature condition of the cooking vessel being heated.

Another object of this invention is to permit easy height adjustment of the control device after it has been assembled in the range.

Another object of this invention is to render the control device applicable to existing ranges without material changes in the standard designs.

Another object of this invention is to construct a durable temperature control device of the indicated type having a minimum number of parts which will render it economical to manufacture.

Briefly stated, in accordance with one aspect of the invention, a telescopic tubular shield is positioned within the center opening of an annular surface heating unit with its upper movable section extending above the top surface of the heating unit. A temperature sensitive element is mounted within the upper section fo the shield and is biased to project beyond the upper end of such upper section. By this arrangement, the temperature sensing element is positioned in engagement with a cooking vessel placed on the surface heating unit to insure accurate temperature response thereto and at the same time is protected from the heat produced by the heating unit by the tubular shield.

The above and other objects and features of the invention will appear more fully hereinafter from a consideration of the following disclosure taken in connection with the accompanying drawings wherein.

While the invention is described in connection with a surface heating element of a cooking range, it should be understood that the invention is not limited to such heating devices of the kind chosen for descriptive purposes herein but may find a wide field of usefulness wherever the control of temperature is desired.

Figures 1, 2:
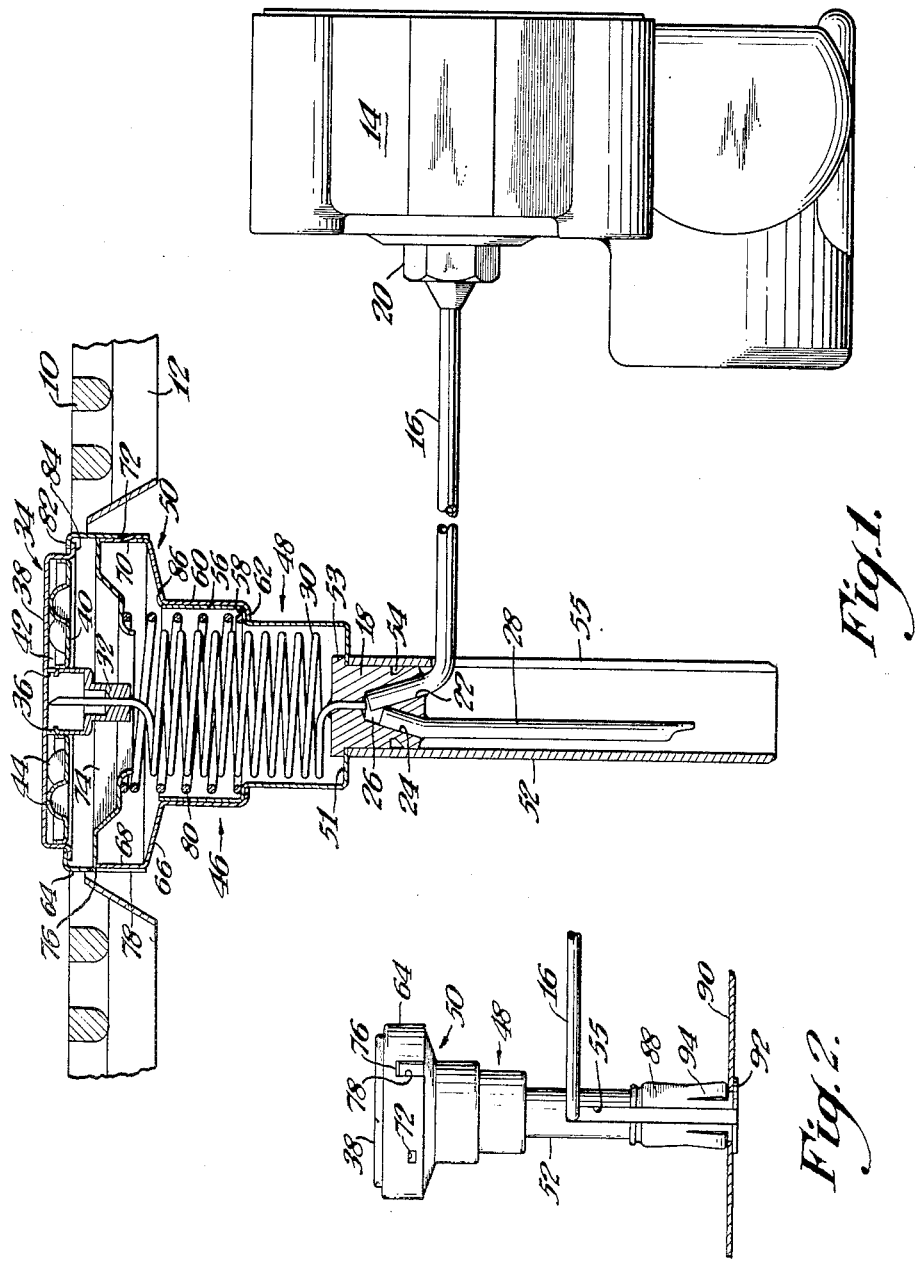
Fig. 1 is an elevation, partly in section, of one embodiment of the invention.
Fig. 2 is an elevation of the portion shown in section in Fig. 1.

Referring more particularly to the drawings, there is shown in Fig. 1 an annular surface heating element 10 supported on an electric range by means of a spider member 12 which rests upon top plate of the range in a well known manner. Heating element 10 is electrically connected in any well known manner (not shown) to a thermostatically operated switch 14 which controls the flow of electric energy thereto. As thermostatically operated switch 14 forms no part of the present invention, further description thereof is deemed unnecessary.

This invention is more particularly directed to the provision of means for controlling the temperature of a cooking vessel adapted to be heated by heating element 10. To this end, a capillary tube 16 is connected at one end to a suitable expansible element (not shown) within thermostatically operated switch 14 and, at its other end, to a connector block 18. The one end of capillary tube 16 is secured to thermostatically operated switch 14 by means of a nut 20. A bore 22 in connector block 18 is adapted to receive the other end of capillary tube 16 which is secured to connector block 18 as by welding. Bore 22 cooperates with a connecting bore 24 in connector block 18 to define a reservoir 26 therein. Bore 24 is adapted to receive one end of a filling capillary tube 28 which is secured to connector block 18 as by welding and has its opposite end closed and sealed after the filling operation.

A third capillary tube 30 is secured, at its one end, to connector block 18, as by welding, to communicate with reservoir 26 and, at its other end, to the interior of a hollow stud 32. Stud 32 is connected to a hollow temperature sensing element 34 and has a pair of openings 36 therein to provide a passageway interconnecting the interior thereof with the interior of temperature sensing element 34. Temperature sensing element 34 comprises a cup-shaped member 38 and an annular plate 40 hermetically sealed at its outer periphery to the inner wall of cup-shaped member 38 and having stud 32 secured to its inner periphery to provide a hermetic seal whereby an enclosed chamber 42 is defined between member 38 and plate 40.

Chamber 42, reservoir 26 and capillary tubes 16, 28, and 30 are charged with a suitable thermal fluid which will expand and contract in response to variations in the temperature sensed by element 34. To assure rapid heat transmission to the thermal fluid within chamber 42, member 38 and plate 40 are formed of a relatively thin material. Since material thin enough to assure rapid heat transmission may flex under pressure variations to thereby vary the volume of chamber 42 and prevent accurate transmission of pressure variations to switch 14, member 38 and plate 40 are secured together at medial points to prevent such flexing. To this end, a plurality (in this instance eight) of circumferentially spaced medial portions 44 on plate 40 are depressed from plane thereto to engage the adjacent side of member 38. The contacting depressed portions 44 are fusibly united to member 38 by soldering, spot welding or the like, and serve to impart rigidity to member 38 and plate 40.

Temperature sensing element 34 is loosely mounted in a telescopic tubular shield 46 which comprises a fixed lower section 48 and a movable upper section 50 telescopically mounted on fixed section 48. Fixed section 48 has a radially extending flange 51 at its lower end which is secured between one end of an elongated tube 52 and an annular shoulder 53 on connector block 18. Connector block 18 is positioned within tube 52 and has an annular groove 54 therein adjacent the inner wall of tube 52. Tube 52 is crimped inwardly at a plurality of points adjacent groove 54 to prevent movement thereof relative to connector block 18. Tube 52 has an elongated slot 55 in the side wall through which capillary tube 16 extends.

Lower section 48 is constructed with an enlarged diameter portion 56 forming a radial shoulder 58 intermediate the ends thereof. Movable section 50 has an elongated guide portion 60, the inner wall of which slidably engages the outer wall of elongated diameter portion 56 for guiding the telescopic movement of movable section 50. Movable section 50 has an inwardly extending radial flange 62 at its lower end underlying the outer wall of shoulder 58 and cooperable therewith to limit the upward movement of movable section 50.

Movable section 50 comprises an upper member 64 and a lower member 66 which includes guide portion 60 and an upper portion 68 of a relatively larger diameter. Upper member 64 is coupled to lower member 66 for conjoint movement therewith. The coupling means comprises a plurality of snap tangs 70 spaced circumferentially on the upper portion 68 extending into matching slots 72 on upper member 64 to restrict the relative movement of members 64 and 66 in an outward direction. The coupling means also includes an annular member 74 secured within the upper portion 68 to rest on lower segment 66 and having a plurality of circumferentially spaced tangs 76 extending into matching slots 78 in upper segment 64 to prevent relative axial movement of members 64 and 66 in an inward direction.

A spring 80 mounted in compression between the inner wall of shoulder 58 and annular member 74 biases movable section 50 to cause engagement of flange 62 with the shoulder 58 whereby the tubular shield 46 is normally biased to its elongated condition. In its biased position, movable section 50 preferably extends slightly above the top surface of heating element 10 for a purpose which will appear more fully hereinafter.

An inwardly extending radial flange 82 is formed on the upper end of upper member 64 in spaced opposed relation to annular member 74. Temperature sensing element 34 has an annular flange 84 formed on member 38 and disposed between radial flange 82 and annular member 74 to be engageable with the opposed walls thereof. Temperature sensing element 34 is normally biased into engagement with flange 82 to position the top surface of member 38 slightly above the open end of movable portion 50 of shield 46. To this end, capillary tube 30 is coiled in the form of a helix in compression between connector block 18 and stud 32. Capillary tube 30 is positioned within tubular shield 46 to be shielded from radiant heat emitting from heating element 10 and serves as a yieldable support for temperature sensing element 34.

It will be apparent that when flange 84 is in engagement with flange 82, the open end of shield 46 is effectively sealed so that food, spilled from cooking vessels on adjacent heaters when heating element 10 is not in use, cannot pass into and be trapped within shield 46. Thus, there is no possibility of material subject to spoilage being accummulated in an inaccessible area to create an odious condition.

Furthermore, engagement of flanges 82 and 84 is effective to provide a path along which heat may flow by conduction to assure rapid heating of the thermal fluid in element 34 in the event that heating element 10 is accidently connected to a source of power when no cooking vessel is in engagement with element 34. This assures rapid cut-off of the heating element 10 in such conditions and prevents "runaway" operation thereof.

Annular flange 84 is cooperable with the upper side of annular member 74 to prevent excessive downward movement of the temperature sensing element 34 against the bias of coiled capillary tube 32 and consequent damage thereto. Downward movement of movable section 50 is restricted by the upper end 86 of fixed section 48 which is engageable with underside of annular member 74.

Figure 5:
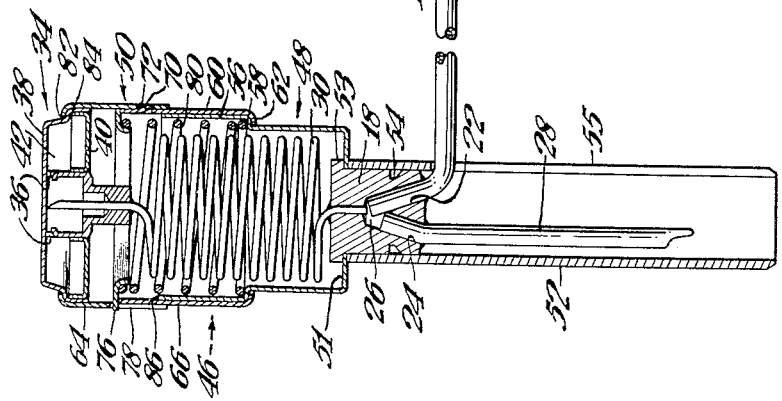
Fig. 5 is an elevation similar to Fig. 4 but with the parts arranged in another position.
Figure 5:
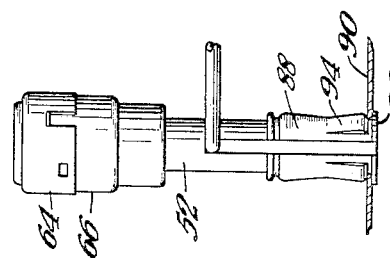
Figure 4:
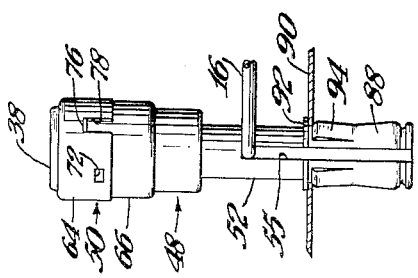
Fig. 4 is an elevation of the portion shown in section in Fig. 3.

Means are provided for adjustably mounting the control device underneath the heating element 10. This means comprises a tubular spring clip 88 adapted to be mounted on a mounting plate 90 which is received between a flange 92 and a plurality of spring arms 94 on spring clip 88. Spring clip 88 is adapted to slidably receive tube 52 therein and spring arms 94 biased inwardly for engagement with tube 52. It will thus be apparent that the installed height of the control device is readily adjustable simply by sliding the device up or down in spring clip 88. This eliminates the necessity for maintaining an accurate dimension between the top of surface heating element 10 and the support for the control device. As shown in Figs. 4 and 5, spring clip 88 may be mounted on mounting plate 90 in reverse positions to permit a greater amplitude of height adjustment.

In the operation of the structure shown, a cooking vessel placed upon the surface of heating element 10 will first engage the base of cup-shaped member 38 to move temperature sensing element 34 downwardly against the bias of coiled capillary tube 30. Thereafter, the cooking vessel will engage the upper end of the movable section 50 of tubular shield 46 to move the same downward against the bias of spring 80 with such movement continuing until the vessel rests firmly on the heating element 10. This arrangement assures good contact of the cooking vessel with the temperature sensing element 34 and movable section 50 of shield 46.

Current will flow from the source of electric energy through switch 14 to energize heating element 10 in the usual manner. The cooking vessel which is supported on the surface of heating element 10 receives heat therefrom and experiences a rise in temperature which causes a corresponding temperature increase in member 38 which is in engagement with the cooking vessel. Heat is conducted through member 38 to the thermal fluid within chamber 42 to cause fluid expansion. Variations in the condition of the thermal fluid in chamber 42 is transmitted by way of capillary tubes 30 and 16 to switch 14 to operate the same and thereby control the temperature at which the food in the vessel will be cooked.

Although temperature sensing element 34 is positioned adjacent to heating element 10, it is shielded from the heat thereof by the movable section 50 of shield 46. Hence, temperature sensing element 34 is responsive primarily to the temperature of the cooking vessel and is only slightly affected, if at all, by the temperature of the heating element 10. The large area of surface on the thermal element exposed to the temperature of the vessel as compared with its volumetric capacity produces a quick response to the temperature of the cooking vessel. Furthermore, the particular construction of the temperature sensing element 34 assures rapid heat transmission through the thin walls thereof while maintaining accurate transmission of pressure variations therein to the thermostatically operated switch 14.

Figure 3:
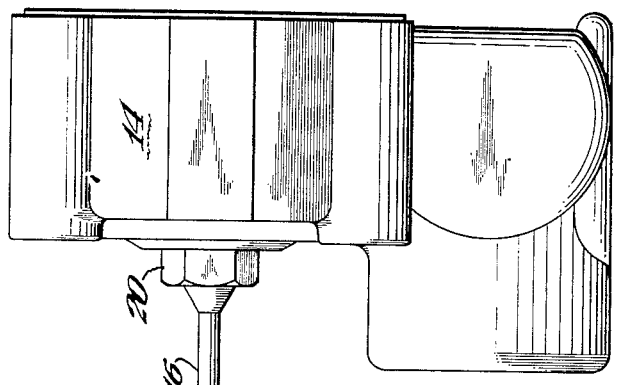
Fig. 3 is an elevation, partly in section, of another embodiment of the invention.

The embodiment of the invention shown in Figs. 3, 4, and 5, wherein parts corresponding to parts hereinbefore described are given like reference numerals, is similar in construction and operation to the embodiment shown in Figs. 1 and 2 but differs therefrom in that lower segment 66 of movable section 50 does not have any enlarged diameter portions and annular plate 40 does not have any depressed portions. The embodiment shown in Figs. 3, 4, and 5 is thus adapted for use with cooking ranges having surface heaters with relatively smaller central openings.

It is to be understood that although several embodiments of this invention have been shown and described, the invention can further be variously embodied and other changes may be made in the construction and ar-

We claim:

1. In a thermostatic control device for surface cooking units, the combination comprising, a fixed tubular section and a movable tubular section forming a telescopic tubular shield, said fixed tubular section having elongated upper and lower cylindrical walls and an annular shoulder therebetween, said movable section having an elongated cylindrical lower member surrounding and slidably engaging said upper wall for guiding telescopic movement of said movable section, an inturned annular flange on the end of said lower member cooperating with said annular shoulder to limit upward movement of said movable section, said movable section having an elongated cylindrical upper member with one end surrounding and coupled to the adjacent end of said lower member for conjoint movement therewith, said one end of said upper member having circumferential spaced slots therein, an annular spring retainer resting on the end of said lower member and having circumferentially spaced tangs extending through said slots, resilient means disposed within the tubular shield and mounted in compression between said annular shoulder and said spring retainer causing said tangs on said retainer to bias said upper member whereby said annular flange engages said annular shoulder and said movable section is biased to an extended position relative to said fixed section, an inwardly extending radial flange on the other end of said upper member, a temperature sensitive element having an annular flange disposed between said radial flange and said spring retainer and being movable therebetween, a capillary tube extending from said temperature sensitive element and having a coiled portion disposed within the lower wall of said fixed section and biasing said temperature sensitive element relative to said upper member whereby the annular flange on said temperature element is engageable with said radial flange.

2. The combination as recited in claim 1 wherein a connector block is attached to the lower wall of said fixed tubular section and forms a support for the coiled portion of said capillary tube.

3. The combination as recited in claim 2 wherein said connector block defines a reservoir communicating with said capillary tube, said temperature sensitive element, said capillary tube and said reservoir containing a thermally expansible fluid.

4. The combination as recited in claim 3 wherein an elongated tube has one end secured to said connector block, and a supporting clip adapted to be mounted on a support resiliently engages said elongated tube whereby said telescopic shield may be movable as a unit to a selective adjusted position relative to said supporting clip.

References Cited in the file of this patent

UNITED STATES PATENTS

| | | |
|---|---|---|
| 2,500,061 | Clark | Mar. 7, 1950 |
| 2,786,930 | Weber | Mar. 26, 1957 |
| 2,862,667 | Hillebrand | Dec. 2, 1958 |
| 2,892,349 | Wiberg et al. | June 30, 1959 |